United States Patent Office 2,804,714
Patented Sept. 3, 1957

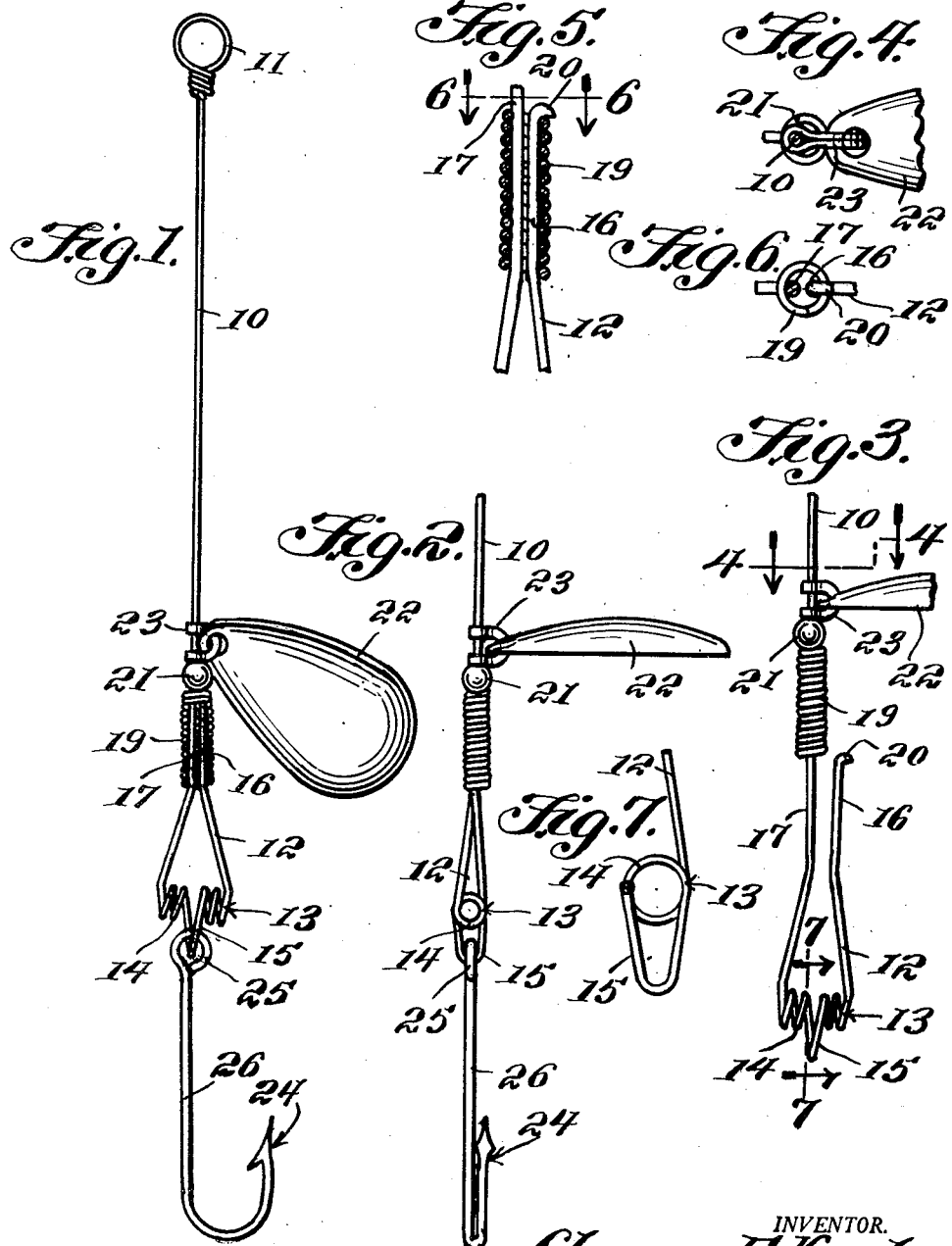

2,804,714

SPINNING FISH LURE

Clarence E. Kratz, Nevada, Mo.

Application June 24, 1955, Serial No. 517,749

3 Claims. (Cl. 43—42.17)

The present invention relates to a fish lure of the type having a spinner.

The primary object of the present invention is to provide a spinning fish lure which will not release the hook while it is being used the lure having a loop at one end for holding that hook and means for keeping the hook from entangling either the spinner of the lure or the clasp formation which holds the ends of the loop together.

Another object of the present invention is to provide a spinning fish lure having a replaceable hook and means for quickly and easily changing the hook.

These and other objects and advantages of the present invention will become apparent from the following description when taken in connection with the annexed drawing, in which:

Figure 1 is a side elevational view of the fish lure of the present invention,

Figure 2 is a front elevational view of the lower portion of the fish lure shown in Figure 1, Figure 3 is a partial view showing the means for connecting the ends of the loop together and showing them in a disconnected condition, Figure 4 is a partial vertical view on line 4—4 of Figure 3, Figure 5 is a partial side view in cross-section of the loop-connecting means shown in a connected condition, Figure 6 is a partial vertical view taken on line 6—6 of Figure 5, and Figure 7 is a partial detail view greatly enlarged as seen on line 7—7 of Figure 3.

Referring in greater detail to the drawing in which like numerals indicate like parts throughout the several views, the present invention consists in a spinning fish lure having a flexible strand 10 fabricated of spring steel wire or the like and having one end portion formed into a closed loop 11 for attaching to a fishing line.

The strand 10 has a portion inwardly of the other end bent back upon itself to form a closable loop 12 of substantially triangular shape with the base 13 of the loop generally straight and wound into a coil 14, there being an odd number of convolutions in the coil 14 with the center convolution 15 elongated with respect to the other convolutions on either side of the center convolution so that one side of the center convolution projects outwardly from the loop 12, as seen in Figure 7.

The part of the strand 10 between the terminating coil convolution and the adjacent strand end serves as a leg 16 and is disposed in side by side relation with respect to the part 17 of the strand inwardly of the coil 14 and the loop 12, the springiness of the strand and the formation of the loop 12 being such as to cause the leg 16 and the 17 to tend to stay apart from each other.

A spring wire sleeve coil 19 surrounds the strand 10 and is movable to a position surrounding both the leg 16 and the strand part 17 for locking them together. The free end of the leg 16 is bent at a right angle away from the part 17 and is sharpened to form a tooth or prong 20 as seen in Figure 5. The internal diameter of the coil 19 is dimensioned so that the leg 16 and the strand part 17 when surrounded by the coil 19 frictionally engage the inner wall of the coil. To remove the coil 19 from the position closing the loop 12 holding the leg 16 and the strand part 17 together, it is necessary to rotate the coil 19 on the strand part 17 with the prong 20 of the leg 16 passing between adjacent turns of the coil 19.

A glass bead 21 is freely slidable and rotatable on the strand 10 and is normally positioned adjacent the end of the coil 19 nearest to the loop 11. A spinner 22 having a shape similar to the bowl of a spoon and fabricated of a bright shiny metal, such as stainless steel, nickel, or the like, has a hole in one end and is secured to the strand 10 by a strip 23 of metal originally annular in shape and folded over the strand in a U-shape with the free end of each of its legs formed into an eye-formation surrounding the strand 10 and with the bight of the strip 23 extending through the hole in the end of the spinner 22.

A fish hook 24 having an eye-formation 25 at one end of its shank 26 is loosely secured in the elongated center convolution 15 of the coil 14, the dimensions of the other convolutions of the coil 14 being such with respect to the dimension of the eye-formation 25 of the hook 24 so that the eye-formation 25 will not pass over the other convolutions of the coil 14 thereby preventing the hook from sliding up the shaft and releasing itself.

Removal of the hook from the coil 14 is accomplished by removing the coil 19 from its position surrounding the strand part 17 and the leg 16, in the position shown in Figure 3, and passing the shank 26 of the fish hook 24 between the sides of the triangle forming the loop 12 and between the strand part 17 and the leg 16 and carrying the eye-formation 25 of the fish hook 24 over successive convolutions of the coil 14 and thence off the strand completely. Replacing the fish hook is accomplished by reversing the above process. The hook when held by its eye-formation in the center convolution 15 of the coil 14 is prevented from moving to any position where it could foul the spinner 22 or engage the means which holds the ends of the loop 12 together.

What is claimed is:

1. A fish lure comprising a strand having means at one end thereof adapted to be attached to a fishing line and having a portion inwardly of the other end thereof formed into a coil having a plurality of convolutions, a part of the strand between said other end and the terminating one of said convolutions extending toward said strand and forming a leg having a free end, a sleeve embodying a coil having a plurality of convolutions circumposed upon the part of said strand inwardly of said first-named coil and freely slidable toward and away from the said first-named coil, said sleeve coil being adapted to receive said leg when moved toward said first-named coil, the free end of said leg being provided with means for engaging between adjacent convolutions of said sleeve coil or engaging the convolution of said sleeve coil remote from said first-named coil when said sleeve coil is moved toward said first-named coil, a fish hook connected to an intermediate convolution of said first-named coil, and a spinner supported on the part of said strand intermediate said one end and said sleeve coil for free rotational movement therearound.

2. A fish lure comprising a strand having means at one end thereof adapted to be attached to a fishing line and having a portion inwardly of the other end thereof formed into a coil having a plurality of convolutions, a part of the strand between said other end and the terminating one of the convolutions extending toward said strand and forming a leg having a free end, a sleeve embodying a coil having a plurality of convolutions circumposed upon the part of said strand inwardly of said first-named coil and freely slidable toward and away from said first-named coil, said sleeve coil being adapted to receive said leg when moved toward said first-named coil, the free end of said leg being provided with means for engaging between adjacent convolutions of said sleeve coil or engaging the convolutions of said sleeve coil remote from said first-named coil when said sleeve coil is moved toward said first-named coil, an intermediate convolution of said first-named coil being elongated, a fish hook having an eye-formation at one end connected by said formation to said elongated coil convolution, and a spinner supported on a part of said strand intermediate said one end and said sleeve coil for free rotational movement therearound.

3. A fish lure comprising a strand having means at one end thereof adapted to be attached to a fishing line and having a portion inwardly of the other end thereof formed into a coil having a plurality of convolutions odd in number, a part of the strand between said other end and the terminating one of said convolutions extending toward said strand and forming a leg having a free end, a sleeve embodying a coil having a plurality of convolutions circumposed upon the part of strand inwardly of said first-named coil and freely slidable toward and away from said first-named coil, said sleeve coil being adapted to receive said leg when moved toward said first-named coil, the free end of said leg being provided with means for engaging between adjacent convolutions of said sleeve coil or engaging the convolutions of said sleeve coil remote from said first-named coil when said sleeve coil is moved toward said first-named coil, the center convolution of said first-named coil being elongated and extending outwardly from said coil on the side thereof remote from said sleeve coil, a fish hook having an eye-formation at one end thereof connected by said formation to said elongated coil convolution, and a spinner supported on the part of said strand intermediate said one end of said sleeve coil for free rotational movement therearound.

References Cited in the file of this patent
UNITED STATES PATENTS

| | | |
|---|---|---|
| 184,627 | Jones | Nov. 21, 1876 |
| 451,341 | Stukes | Apr. 28, 1891 |
| 1,272,812 | Keister | July 16, 1918 |

FOREIGN PATENTS

| | | |
|---|---|---|
| 783,937 | France | Apr. 15, 1935 |
| 937,485 | France | Mar. 8, 1948 |
| 1,076,852 | France | Apr. 21, 1954 |